(12) United States Patent
Yoshizaki et al.

(10) Patent No.: US 10,934,929 B2
(45) Date of Patent: *Mar. 2, 2021

(54) CONTROLLER AND CONTROL METHOD FOR WASTEGATE

(71) Applicant: TOYOTA JIDOSHA KABUSHIKI KAISHA, Toyota (JP)

(72) Inventors: Satoshi Yoshizaki, Gotenba (JP); Masahiro Inoue, Toyota (JP); Koji Honda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 17 days.

This patent is subject to a terminal disclaimer.

(21) Appl. No.: 16/194,501

(22) Filed: Nov. 19, 2018

(65) Prior Publication Data

US 2019/0162114 A1  May 30, 2019

(30) Foreign Application Priority Data

Nov. 30, 2017 (JP) .............................. JP2017-230879

(51) Int. Cl.
  *F02B 37/18* (2006.01)
  *F02D 41/00* (2006.01)
  *F02D 41/20* (2006.01)

(52) U.S. Cl.
  CPC ........ *F02B 37/186* (2013.01); *F02D 41/0007* (2013.01); *F02D 41/20* (2013.01)

(58) Field of Classification Search
  CPC ...... F02B 37/18; F02B 37/183; F02B 37/186; F02B 37/007; F02B 37/16; F02D 41/0007; F02D 41/20

(Continued)

(56) References Cited

U.S. PATENT DOCUMENTS 4,656,834 A * 4/1987 Elpern .................. F02B 37/183
                                              60/602
4,698,972 A * 10/1987 Ueno ...................... F02B 37/18
                                              60/602

(Continued)

FOREIGN PATENT DOCUMENTS

EP     2439393 A1 * 4/2012 ......... F02D 41/0007
JP     5-231165       9/1993

(Continued)

OTHER PUBLICATIONS

Office Action dated Dec. 9, 2019 in co-pending U.S. Appl. No. 16/151,952.

*Primary Examiner* — Thai Ba Trieu (74) *Attorney, Agent, or Firm* — Oblon, McClelland, Maier & Neustadt, L.L.P.

(57) ABSTRACT

A wastegate is provided in an exhaust bypass passage that allows exhaust gas to bypass a turbine wheel of an exhaust turbine-type forced-induction device. A required boost pressure is set in accordance with a running state of an engine. A controller is configured to control a drive force of the wastegate to a magnitude that achieves the required boost pressure when the required boost pressure is higher than a preset pressure, and control the drive force to a magnitude that achieves a higher boost pressure than the required boost pressure when the required boost pressure is less than or equal to the preset pressure.

6 Claims, 4 Drawing Sheets (58) Field of Classification Search
USPC .................. 60/612, 611, 605.1; 123/562
See application file for complete search history.

(56) References Cited

U.S. PATENT DOCUMENTS

| | | | | |
|---|---|---|---|---|
| 4,781,027 A * | 11/1988 | Richter | ................ | F02B 37/007 60/612 |
| 4,970,864 A * | 11/1990 | Kazuo | ................ | F02B 37/18 60/602 |
| 5,090,204 A * | 2/1992 | Bonitz | ................ | F02B 37/007 60/612 |
| 5,289,683 A * | 3/1994 | Kurihara | ............ | F02D 41/0007 60/602 |
| 5,845,495 A * | 12/1998 | Schray | ................ | F02B 37/007 60/612 |
| 6,012,289 A * | 1/2000 | Deckard | ................ | F02B 37/18 60/602 |
| 6,050,250 A * | 4/2000 | Kerkau | ................ | F02B 37/007 60/602 |
| 6,715,289 B2 * | 4/2004 | Mader | ................ | F02B 37/007 60/612 |
| 6,886,335 B2 * | 5/2005 | Tabata | ................ | F02B 37/186 60/602 |
| 7,380,401 B2 * | 6/2008 | Henn | ................ | F02B 37/007 60/612 |
| 7,434,397 B2 * | 10/2008 | Hasegawa | ................ | F01N 3/00 60/602 |
| 8,001,782 B2 * | 8/2011 | Pursifull | ................ | F02B 37/007 60/612 |
| 8,297,054 B2 | 10/2012 | Gladden et al. | | |
| 8,413,441 B2 * | 4/2013 | Pursifull | ................ | F02B 37/007 60/612 |
| 8,739,530 B2 * | 6/2014 | Bjorge | ................ | F02B 37/007 60/612 |
| 9,109,504 B2 | 8/2015 | Wang et al. | | |
| 9,151,217 B2 * | 10/2015 | Hilditch | ................ | F02B 37/007 |
| 9,243,553 B2 | 1/2016 | Kokotovie et al. | | |
| 10,100,753 B2 * | 10/2018 | Saito | ................ | F02B 37/007 |
| 10,711,687 B2 * | 7/2020 | Yoshizaki | ................ | F02B 37/18 |
| 2003/0024499 A1 * | 2/2003 | Umezono | ................ | F02D 41/3029 123/564 |
| 2008/0066723 A1 * | 3/2008 | Eiraku | ................ | F02B 39/16 123/564 |
| 2011/0072804 A1 * | 3/2011 | Van Nieuwstadt | ................ | F02D 41/0055 60/287 |
| 2011/0314807 A1 * | 12/2011 | Karnik | ................ | F02B 37/183 60/602 |
| 2012/0085092 A1 * | 4/2012 | Hotta | ................ | F02B 37/186 60/600 |
| 2014/0360178 A1 * | 12/2014 | Wang | ................ | F02B 37/183 60/602 |
| 2015/0226108 A1 * | 8/2015 | Vroman | ................ | F28F 9/027 60/605.2 |
| 2016/0305353 A1 * | 10/2016 | Sase | ................ | F02D 41/30 |
| 2018/0163615 A1 * | 6/2018 | Kurauchi | ................ | F02D 41/0007 |
| 2018/0328269 A1 * | 11/2018 | Aoyagi | ................ | F02B 37/183 |
| 2019/0345869 A1 * | 11/2019 | Ono | ................ | F02B 37/186 |

FOREIGN PATENT DOCUMENTS

| | | |
|---|---|---|
| JP | 7-332136 | 12/1995 |
| JP | 2008-180176 A | 8/2008 |
| JP | 2015-108330 A | 6/2015 |
| JP | 2015-214935 A | 12/2015 |
| JP | 2017-180212 A | 10/2017 |

* cited by examiner

CONTROLLER AND CONTROL METHOD FOR WASTEGATE

BACKGROUND

The present disclosure relates to a controller and a control method for a wastegate. The wastegate is provided in a bypass passage that allows exhaust gas to bypass the turbine wheel of an exhaust turbine-type forced-induction device.

As described in Japanese Laid-Open Patent 5-231165, some of the controllers for wastegates of exhaust turbine-type forced-induction devices control a boost pressure of the engine by controlling the opening degree of the wastegate.

A wastegate is driven against the friction of sliding parts of the wastegate or against the friction of sliding parts of the drive mechanism.

Thus, when wastegates vary in friction, variation also occurs in the response of drive control of the wastegates. This will result in deterioration of the controllability.

SUMMARY

It is an object of the present disclosure to provide a controller and a control method for a wastegate that limit the variation in response.

Example 1 is a controller for a wastegate. The wastegate is provided in an exhaust bypass passage that allows exhaust gas to bypass a turbine wheel of an exhaust turbine-type forced-induction device. The differential pressure of exhaust gas that results from the pressure loss when passing through the turbine wheel acts on the wastegate controlled by such a controller. Thus, holding the opening degree of the wastegate requires a drive force large enough to counter such a differential pressure. Further, the pressure acting on the wastegate increases as the boost pressure increases. Thus, a larger drive force is necessary to achieve a higher boost pressure.

Wastegates and the drive mechanisms vary in friction. The variation in the friction causes the response of control of the wastegate to vary. The friction affects the response of the drive control of the wastegate to a larger extent as the drive force for driving the wastegate becomes smaller. Thus, the variation in the friction increases the variation in the response of the drive control of the wastegate when driving with a small drive force.

In the controller of example 1, a required boost pressure is set in accordance with a running state of an engine. The controller is configured to control a drive force of the wastegate to a magnitude that achieves the required boost pressure when the required boost pressure is higher than a preset pressure and control the drive force to a magnitude that achieves a higher boost pressure than the required boost pressure when the required boost pressure is less than or equal to the preset pressure. The required boost pressure is set in accordance with the running state of the engine while the engine is running in the boost region. That is, when a high boost pressure is assigned to the required boost pressure and the drive force necessary to achieve the required boost pressure is large, the drive force of the wastegate is controlled to a magnitude necessary to achieve the required boost pressure. When a low boost pressure is assigned to the required boost pressure and the drive force necessary to achieve the required boost pressure is small, the drive force of the wastegate is controlled to a magnitude necessary to achieve a higher pressure than the required boost pressure. This limits the driving of the wastegate with a small drive force in which the variation in friction greatly affects the response of control. Accordingly, the response varies in a limited manner in the controller for the wastegate.

In example 2, the controller is further configured to control the drive force through feedback control in which the drive force is input and the boost pressure is output, assign the required boost pressure to a target value of the feedback control when the required boost pressure is higher than the preset pressure, and assign a higher pressure than the required boost pressure to the target value of the feedback control when the required boost pressure is less than or equal to the preset pressure. This allows for control of the drive force in the controller for the wastegate.

In example 3, the controller is configured to assign the preset pressure to the target value of the feedback control when the required boost pressure is less than or equal to the preset pressure. In this manner, when the required boost pressure changes across the preset pressure, the value of the target boost pressure changes continuously. This keeps the continuity of the feedback control.

In an engine having a multi-bank structure in which a plurality of banks are each provided with an exhaust turbine-type forced-induction device separately, the variation in the response may vary the opening degree of the wastegate of the exhaust turbine-type forced-induction device of each bank. As a result, the difference in the back pressure varies the internal EGR amount and the amount of residual gas in the cylinders so that the combustion can deteriorate. In example 4, the engine to which the controller of example 1 is applied has a multi-bank structure including a plurality of banks, and the exhaust turbine-type forced-induction device is one of a plurality of exhaust turbine-type forced-induction devices, which are respectively provided in the banks of the engine. When control of the wastegate of each bank is performed by the above controller, even if the friction varies in the wastegate of each bank, the response varies in a limited manner. This limits variation in the opening degree between the banks, which causes the combustion to deteriorate.

Example 5 is embodied as a method for controlling the wastegate that executes the processes described in examples 1 to 4.

Example 6 is embodied as a non-transitory computer-readable storage medium that stores a program causing a processor to execute the processes described in examples 1 to 4.

Other aspects and advantages of the present disclosure will become apparent from the following description, taken in conjunction with the accompanying drawings, illustrating by way of example the principles of the present disclosure.

BRIEF DESCRIPTION OF THE DRAWINGS

The present disclosure, together with objects and advantages thereof, may best be understood by reference to the following description of the presently preferred embodiments together with the accompanying drawings in which.

DETAILED DESCRIPTION

A controller for a wastegate according to one embodiment will now be described with reference to FIGS. 1 to 6.

First, the structure of an intake and exhaust system of the engine 10 to which the controller for a wastegate of the present embodiment is applied will be described with reference to FIG. 1. The white arrows in FIG. 1 represent the direction in which intake air flows in the intake system of the engine 10, and the black arrows represent the direction in which exhaust gas flows in the exhaust system of the engine 10.

Figure 1:
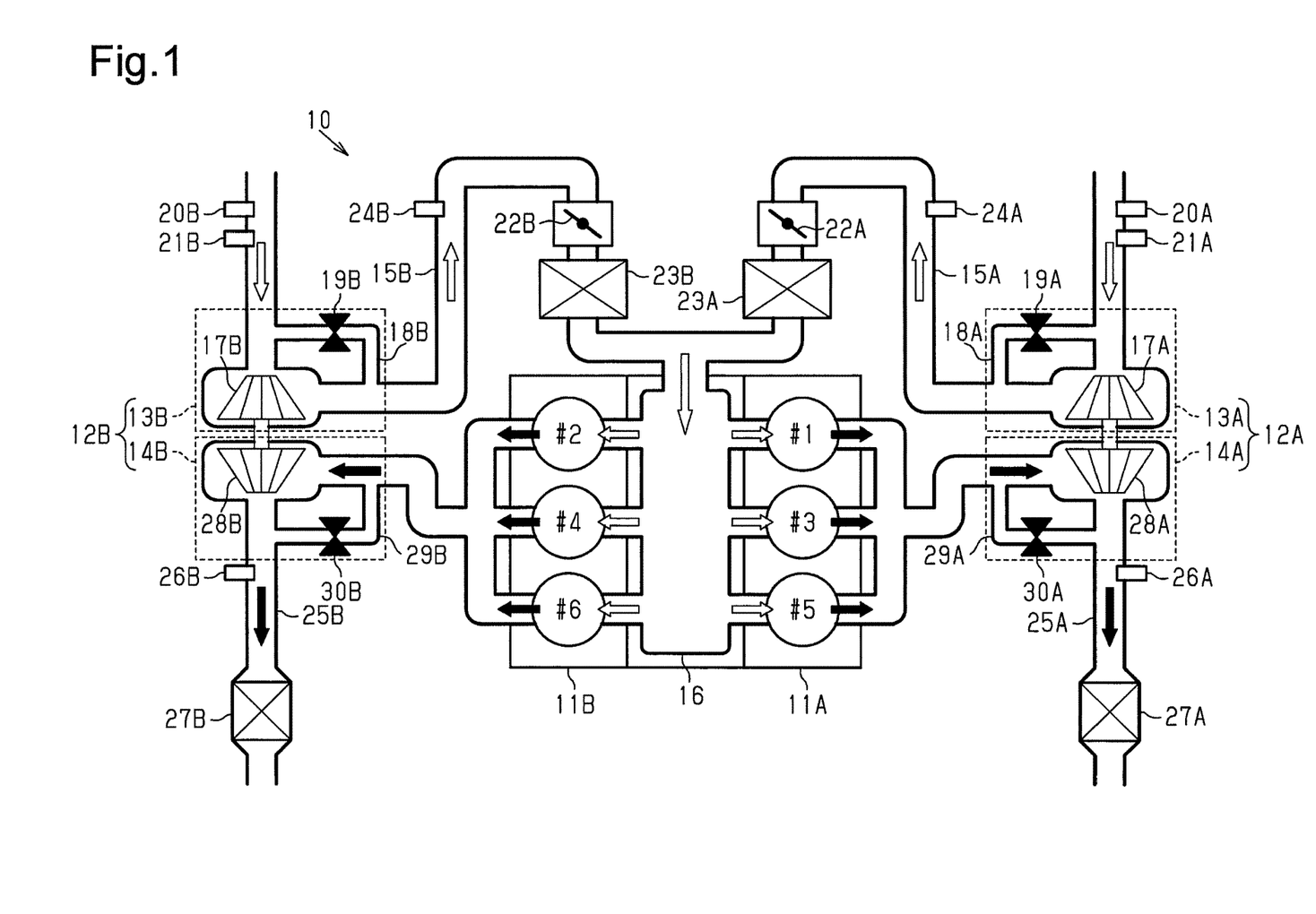
FIG. 1 is a schematic diagram showing the structure of an intake and exhaust system of the engine provided with a controller for a wastegate of one embodiment.

As shown in FIG. 1, the controller for the wastegate of the present embodiment is applied to the engine 10, which is a V6 engine. In the engine 10, six cylinders #1 to #6 are arranged separately in two banks, namely, a first bank 11A and a second bank 11B. The cylinders of the engine 10 are fired in the order of the cylinder #1, the cylinder #2, the cylinder #3, the cylinder #4, the cylinder #5, and the cylinder #6. Three cylinders, namely, the cylinders #1, #3, and #5, are arranged in the first bank 11A, and three cylinders, namely, the cylinders #2, #4, and #6, are arranged in the second bank 11B, respectively.

The engine 10 includes two exhaust turbine-type forced-induction devices 12A and 12B, which are respectively arranged for the first bank 11A and the second bank 11B. The exhaust turbine-type forced-induction devices 12A and 12B respectively include compressors 13A and 13B, which compress intake air, and turbines 14A and 14B, which receive exhaust gas to drive the compressors 13A and 13B.

The engine 10 includes a first intake passage 15A and a second intake passage 15B. The first intake passage 15A is provided with the compressor 13A of the exhaust turbine-type forced-induction device 12A for the first bank 11A, and the second intake passage 15B is provided with the compressor 13B of the exhaust turbine-type forced-induction device 12B for the second bank 11B. The first intake passage 15A and the second intake passage 15B merge with each other to be connected to a surge tank 16 so that intake air is supplied and distributed from the surge tank 16 to each of the cylinders #1 to #6.

The compressors 13A and 13B respectively include compressor wheels 17A and 17B, which compress intake air when the compressor wheels 17A and 17B rotate. Further, the compressors 13A and 13B respectively include intake bypass passages 18A and 18B, which bypass the compressor wheels 17A and 17B for intake air to flow in the intake bypass passages 18A and 18B, and air bypass valves 19A and 19B, which respectively open and close the intake bypass passage 18A and 18B.

Air flow meters 20A and 20B and atmospheric pressure sensors 21A and 21B are respectively provided upstream of the compressors 13A and 13B in the first intake passage 15A and the second intake passage 15B. The air flow meters 20A and 20B detect the flow rate of intake air flowing through the first intake passage 15A and the second intake passage 15B.

The atmospheric pressure sensors 21A and 21B detect atmospheric pressure. Further, throttle valves 22A and 22B and intercoolers 23A and 23B are respectively provided downstream of the compressors 13A and 13B in the first intake passage 15A and the second intake passage 15B. The throttle valves 22A and 22B adjust the flow rate of intake air. The intercoolers 23A and 23B cool intake air. Additionally, boost pressure sensors 24A and 24B, which detect boost pressure PB, are respectively provided downstream of the compressors 13A and 13B and upstream of the throttle valves 22A and 22B in the first intake passage 15A and the second intake passage 15B. In the following description, the value of the boost pressure PB indicates the absolute pressure of intake air flowing at a section where the boost pressure sensors 24A and 24B are provided.

Additionally, the engine 10 includes a first exhaust passage 25A, through which exhaust gas of each of the cylinders #1, #3, and #5 of the first bank 11A flows, and a second exhaust passage 25B, through which exhaust gas of each of the cylinders #2, #4, and #6 of the second bank 11B flows. The first exhaust passage 25A is provided with the turbine 14A of the exhaust turbine-type forced-induction device 12A for the first bank 11A, and the second exhaust passage 25B is provided with the turbine 14B of the exhaust turbine-type forced-induction device 12B for the second bank 11B. Air-fuel ratio sensors 26A and 26B, which detect the air-fuel ratio of an air-fuel mixture burned in each of the cylinders #1 to #6, are respectively provided downstream of the turbines 14A and 14B in the first exhaust passage 25A and the second exhaust passage 25B. In addition, catalytic devices 27A and 27B, which purify exhaust gas, are respectively provided downstream of the air-fuel ratio sensors 26A and 26B in the first exhaust passage 25A and the second exhaust passage 25B.

The turbines 14A and 14B respectively include turbine wheels 28A and 28B, which rotate when receiving exhaust gas that passes through the turbine wheels 28A and 28B. In the exhaust turbine-type forced-induction devices 12A and 12B, the turbine wheels 28A and 28B are respectively coupled to the compressor wheels 17A and 17B so that they are integrally rotatable. Rotation of the turbine wheels 28A and 28B rotates the compressor wheels 17A and 17B to drive the compressors 13A and 13B. In addition, the turbines 14A and 14B respectively include exhaust bypass passages 29A and 29B and wastegates 30A and 30B. The exhaust bypass passages 29A and 29B allow exhaust gas to bypass the turbine wheels 28A and 28B. The wastegates 30A and 30B respectively open and close the exhaust bypass passages 29A and 29B.

Figure 2:
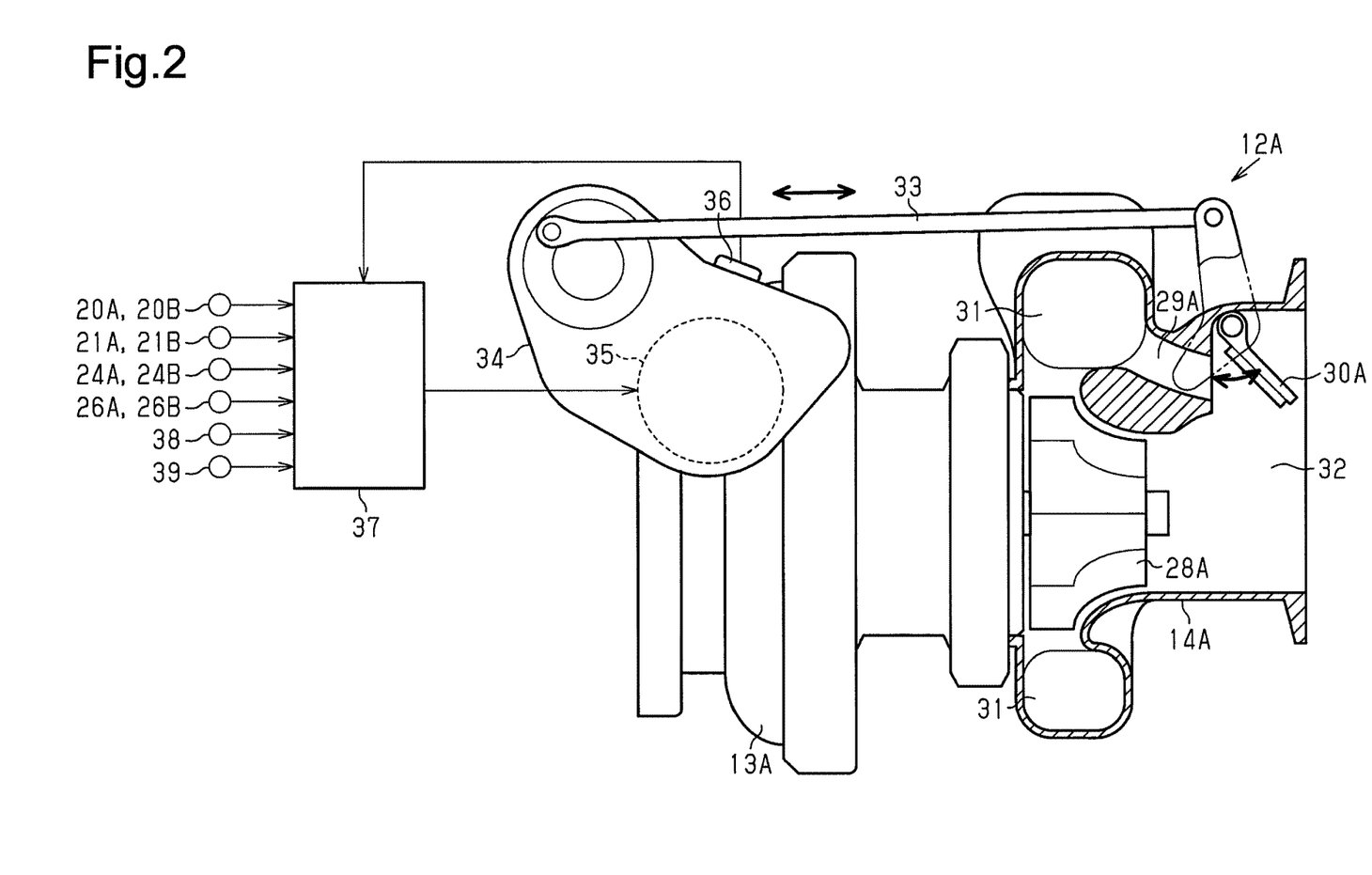
FIG. 2 is a partial, cross-sectional diagram showing an exhaust turbine-type forced-induction device for the engine shown in FIG. 1.

FIG. 2 shows the partial, cross-sectional structure of the exhaust turbine-type forced-induction device 12A for the first bank 11A. The exhaust turbine-type forced-induction device 12B for the second bank 11B has the same structure as the exhaust turbine-type forced-induction device 12A for the first bank 11A.

The turbine 14A (14B) of the exhaust turbine-type forced-induction device 12A (12B) includes a scroll passage 31, which circles around the outer side of the turbine wheel 28A (28B) in the radial direction, and an exhaust flow outlet 32, out of which exhaust gas is emitted. Further, the turbine 14A (14B) includes the exhaust bypass passage 29A (29B) to allow direct communication between the scroll passage 31 and the exhaust flow outlet 32. The wastegate 30A (30B) is provided on the opening of the exhaust bypass passage 29A (29B) in the exhaust flow outlet 32.

The wastegate 30A (30B) is attached to the turbine 14A (14B) operably in a direction away from the opening of the exhaust bypass passage 29A (29B) at the side of the exhaust flow outlet 32 (hereinafter referred to as opening direction) and in a direction toward the opening (hereinafter referred to as closing direction). In the following description, the state in which the wastegate valve 30A (30B) is closed so as to close the opening is referred to as "fully-closed." Further, the state in which the wastegate valve 30A (30B) is located on a limit operation position in the opening direction of the operation range is referred to as "fully-open." In addition, the amount of changes in the operation position of the wastegate valve 30A (30B) in the opening direction from the fully-closed operation position is referred to as the "opening degree" of the wastegate valve 30A (30B).

An actuator 34 is coupled to the wastegate 30A (30B) by a rod 33. The actuator 34 incorporates a direct-current motor 35. Power generated by the direct-current motor 35 in accordance with energization is transmitted through the rod 33 to the wastegate 30A (30B) so that a drive force is applied to the wastegate 30A (30B). In addition, the actuator 34 includes an opening degree sensor 36 that detects the opening degree of the wastegate 30A (30B) (hereinafter referred to as WGV opening degree).

The present embodiment includes a controller 37 configured as a microcomputer for engine control. The controller 37 performs drive control of the wastegate 30A (30B) as an intake air control of the engine 10. Detection results of the air flow meters 20A and 20B, the atmospheric pressure sensors 21A and 21B, the boost pressure sensors 24A and 24B, the air-fuel ratio sensors 26A and 26B, and the opening degree sensor 36 are input to the controller 37. Further, detection results of a vehicle sensor 38, which detects the travelling speed of the vehicle equipped with the engine 10, i.e., a vehicle speed SPD, an accelerator position sensor 39, which detects the depression amount of the accelerator pedal by the driver of the vehicle, i.e., an acceleration position ACCP, and the like are input to the controller 37.

When the engine 10 is run in a natural aspiration region, the controller 37 controls the wastegates 30A and 30B to be fully-open in order to limit increases in the back pressure that result from the pressure loss of exhaust gas when passing through the turbines 14A and 14B. When the engine 10 is run in a boost region, the controller 37 performs drive control of the wastegates 30A and 30B to control the boost pressure PB. The drive control is performed through feedback control in which the drive force of the wastegates 30A and 30B is input and the boost pressure PB is output. The detail of the drive control of the wastegates 30A and 30B to control the boost pressure PB (hereinafter referred to as boost pressure control) will now be described.

Figure 3:
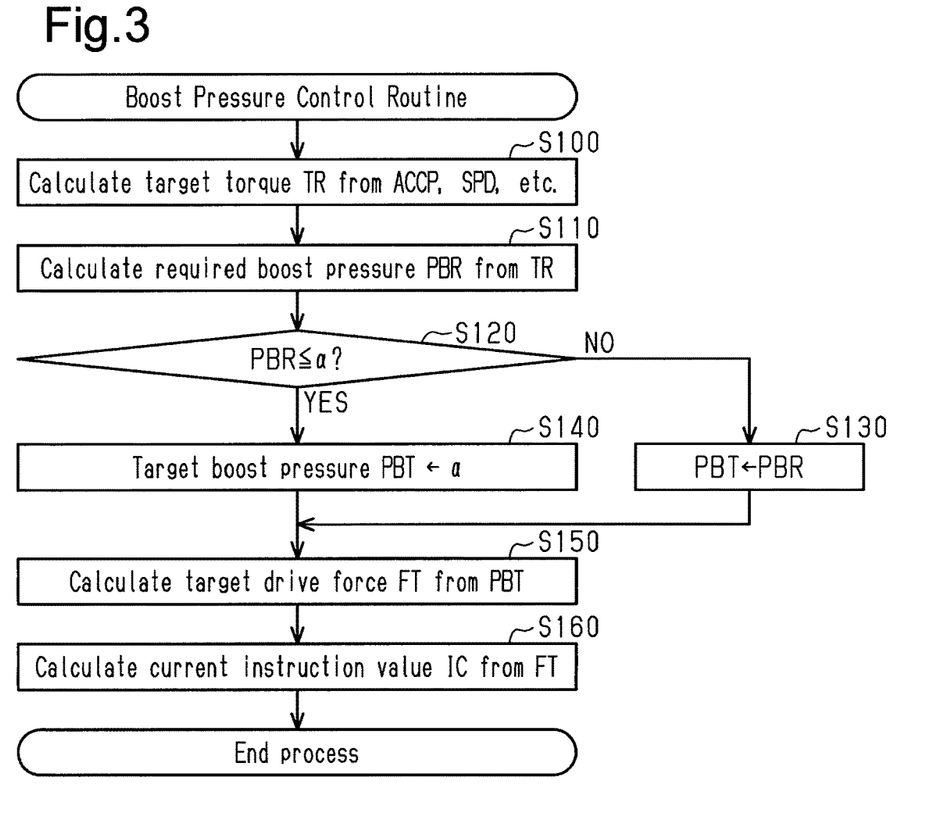
FIG. 3 is a flowchart showing a boost pressure control routine executed by the controller in the engine shown in FIG. 1.

FIG. 3 shows a flowchart of a boost pressure control routine executed by the controller 37 for the boost pressure control. The controller 37 repeatedly executes a process of the boost pressure control routine at preset control intervals while the engine 10 is running in the boost region under the condition that the execution of control for failure diagnosis, overheating prevention of the catalytic devices 27A and 27B, and the like, which have a higher priority than the boost pressure control, has not been required.

When the process of the boost pressure control routine is started, in step S100, a target torque TR, which is a target value of engine torque, is first calculated based on the detection values of an acceleration opening degree ACCP, a vehicle speed SPD, and the like that indicate the running state of the engine 10. Subsequently, in step S110, the boost pressure necessary to generate engine torque corresponding to the target torque TR is calculated as a value of a required boost pressure PBR based on the target torque TR. In the natural aspiration region, the standard atmospheric pressure (1013.25 [hPa]) is assigned to the value of the required boost pressure PBR.

In a process of a routine that differs from the boost pressure control routine, the controller 37 calculates a target intake manifold pressure PMT, which is a target value of pressure of intake air (intake manifold pressure) at a section downstream of the throttle valves 22A and 22B, from the target torque TR. The value of the target intake manifold pressure PMT is calculated to be less than or equal to the atmospheric pressure in the natural aspiration region and calculated to be equal to the required boost pressure PBR in the boost region. Further, the controller 37 performs opening degree control of the throttle valves 22A and 22B for the opening degree to achieve the target intake manifold pressure PMT.

When the required boost pressure PBR is calculated in step S110, it is determined in step S120 whether or not the calculated required boost pressure PBR is less than or equal to a preset pressure α. A higher pressure than the standard atmospheric pressure is assigned to the preset pressure α. Further, if the required boost pressure PBR is higher than the preset pressure α (step S120: NO), the process proceeds to step S130. In step S130, the value of the required boost pressure PBR is assigned to the value of a target boost pressure PBT, which is a target value of the feedback control. If the required boost pressure PBR is less than or equal to the preset pressure α (step S120: YES), the process proceeds to step S140. In step S140, the value of the preset pressure α is assigned to the value of the target boost pressure PBT.

Either if the process proceeds to step S130 or if the process proceeds to step S140, the process thereafter proceeds to step S150. In step S150, a value of a target drive force FT is calculated based on the target boost pressure PBT. To calculate the target drive force FT, a value of a feedforward term of the target drive force FT is obtained from the target boost pressure PBT by referring to a calculation map that stores the relationship of the target boost pressure PBT obtained in advance through experiments or the like and the drive force of the wastegates 30A and 30B, which is necessary to achieve the target boost pressure PBT. Subsequently, a feedback term of the target drive force FT is obtained from the difference between the target boost pressure PBT and the boost pressure PB, and the sum obtained by adding the feedback term to the feedforward term is calculated as a value of the target drive force FT. In the present embodiment, the average value of the detection values of the two boost pressure sensors 24A and 24B is used as the value of the boost pressure PB, which is used to calculate the feedback term.

In step S160, the drive current of the direct-current motor 35 necessary to generate the drive force corresponding to the target drive force FT is calculated as a value of a current instruction value IC based on the target drive force FT. Then, the process of the current boost pressure control routine is ended. The controller 37 performs the drive control of the wastegates 30A and 30B for the boost pressure control by outputting the calculated current instruction value IC to the direct-current motor 35. As the value assigned to the current instruction value IC becomes higher, the drive force in the closing direction applied to the wastegates 30A and 30B by the actuator 34 during the drive control becomes larger.

The operation and advantages of the present embodiment will now be described.

As described above, in the boost region of the engine 10, the controller 37 controls the boost pressure PB by performing the feedback control, in which the drive force of the wastegates 30A and 30B, i.e., the current instruction value IC, is input and the boost pressure PB is output. Further, the controller 37 sets the target boost pressure PBT, which is a target value of the feedback control, in accordance with the required boost pressure PBR, which is set in accordance with the running state of the engine 10.

Figure 4:
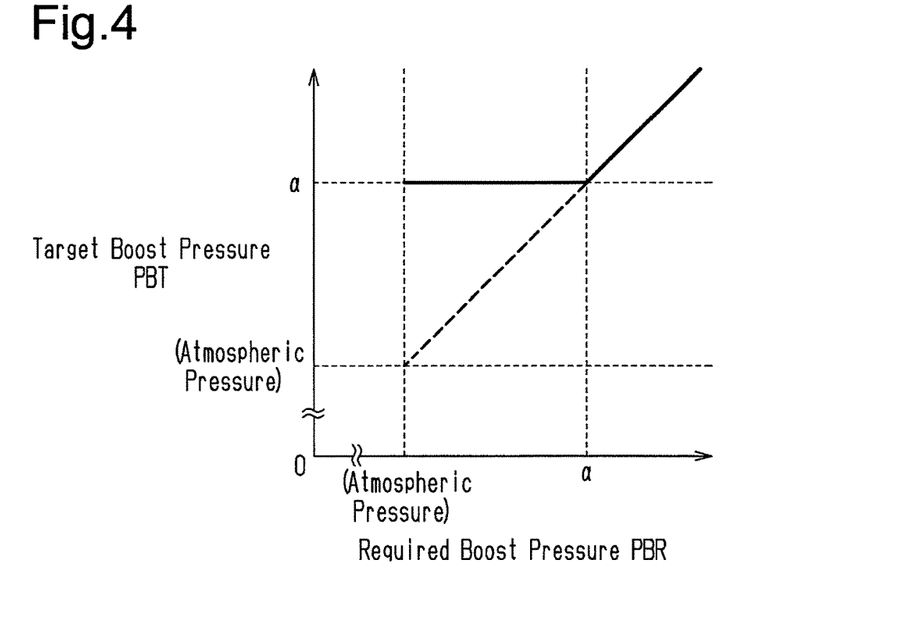
FIG. 4 is a graph showing the relationship of the value of a required boost pressure and the value of a target boost pressure, in which the two values are set in a process of the boost pressure control routine in the engine shown in FIG. 1.

As shown in FIG. 4, when the required boost pressure PBR is higher than the preset pressure α, the controller 37 of the present embodiment assigns the value of the required boost pressure PBR to the value of the target boost pressure PBT. When the required boost pressure PBR is less than or equal to the preset pressure α, the controller 37 assigns the preset pressure α to the value of the target boost pressure PBT. Thus, in the boost pressure control, the drive force of the wastegates 30A and 30B is controlled to a magnitude that achieves the required boost pressure when the required boost pressure PBR is higher than the preset pressure α, and the drive force is controlled to a magnitude that achieves a higher boost pressure than the required boost pressure PBR (preset pressure α) when the required boost pressure PBR is less than or equal to the preset pressure α.

Figure 5:
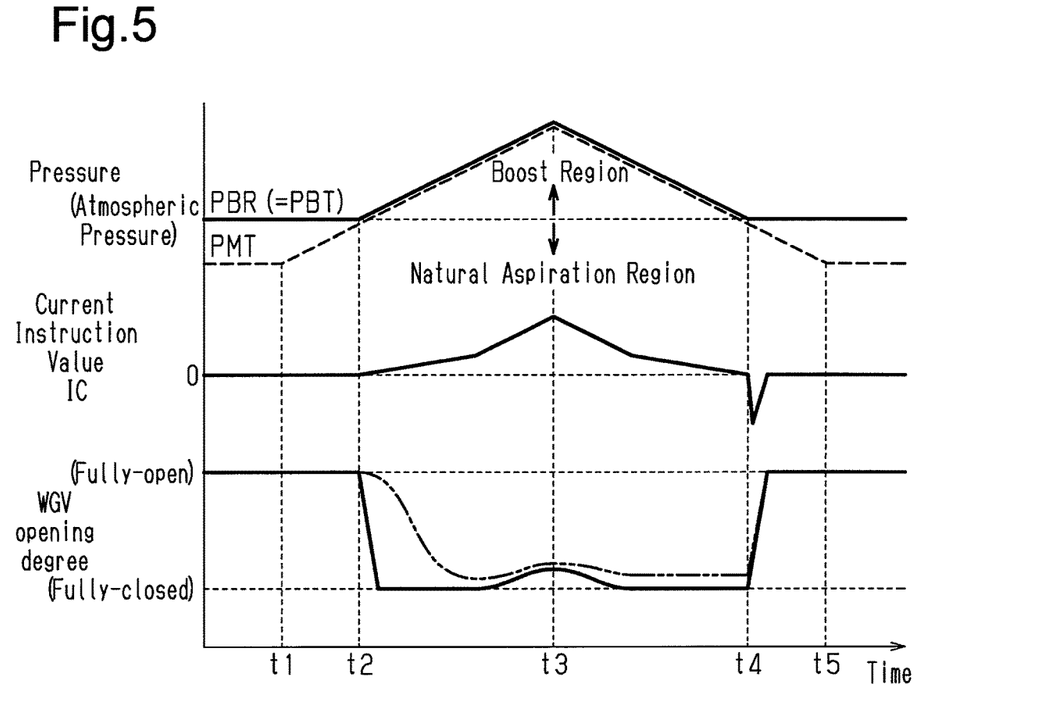
FIG. 5 is a time chart showing, as a comparative example, how control is performed in a case of performing boost pressure control by constantly assigning a value of the required boost pressure to a value of the target boost pressure.

FIG. 5 shows how the boost pressure control is performed when the value of the required boost pressure PBR is constantly assigned to the value of the target boost pressure PBT regardless of whether or not the required boost pressure PBR is high or low. FIG. 5 shows a state in which the target intake manifold pressure PMT monotonically increases from a lower pressure than the atmospheric pressure to a higher pressure than the atmospheric pressure during a period from time t1 to time t3 and the target intake manifold pressure PMT monotonically decreases from the higher pressure than the atmospheric pressure to the lower pressure than the atmospheric pressure during a period from time t3 to time t5. In such a case, the boost pressure control is performed during a period from time t2, at which the target intake manifold pressure PMT increases to be greater than or equal to the atmospheric pressure, to time t4, at which the target intake manifold pressure PMT subsequently decreases to be less than or equal to the atmospheric pressure again.

The wastegates 30A and 30B are fully-open during a period in which the engine 10 is run in the natural aspiration region before time t2, at which the boost pressure control is started. Thus, the wastegates 30A and 30B are driven in the closing direction immediately after the boost pressure control is started at time t2.

Force in the opening direction is applied to the wastegates 30A and 30B by the differential pressure of exhaust gas that results from the pressure loss when passing through the turbine wheels 28A and 28B. The driving of the wastegates 30A and 30B in the closing direction requires a larger drive force in the closing direction than the force in the opening direction resulting from the differential pressure. Further, the differential pressure is large when the boost pressure PB is high, and the differential pressure is small when the boost pressure PB is low. Thus, in the boost pressure control, the drive force of the wastegates 30A and 30B, i.e., the current instruction value IC, is smaller when a low boost pressure is assigned to the target boost pressure PBT than when a high boost pressure is assigned to the target boost pressure PBT.

The driving of the wastegates 30A and 30B in the closing direction immediately after starting the boost pressure control is performed in a state in which a low boost pressure is assigned to the required boost pressure PBR. Thus, when the value of the required boost pressure PBR is assigned to the value of the target boost pressure PBT, the driving of the wastegates 30A and 30B in the closing direction has to be performed with a small drive force (current instruction value IC).

The friction of the wastegates 30A and 30B, the actuator 34, and the like varies. The variation in the friction causes the response of control of the wastegates 30A and 30B to vary. The variation in the response, which results from the variation in the friction, becomes larger as the drive force that drives the wastegates 30A and 30B becomes smaller.

In FIG. 5, the change of the WGV opening degree of a wastegate having a small friction is represented by the solid line, and the change of the WGV opening degree of a wastegate having a large friction is represented by the long dashed double-short dashed line. As shown in FIG. 5, if the required boost pressure PBR is constantly assigned to the target boost pressure PBT to control the drive force, in a state in which the required boost pressure PBR is low, the variation in the WGV opening degree resulting from the variation in the friction is large when the wastegates 30A and 30B are driven in the closing direction immediately after starting the boost control performed with a small drive force. When the friction varies between the wastegates 30A and 30B of the two banks and the WGV opening degrees of the two exhaust turbine-type forced-induction devices 12A and 12B deviate from each other, the difference in the back pressure varies the internal EGR amount and the amount of residual gas in the cylinders so that the combustion can deteriorate.

Figure 6:
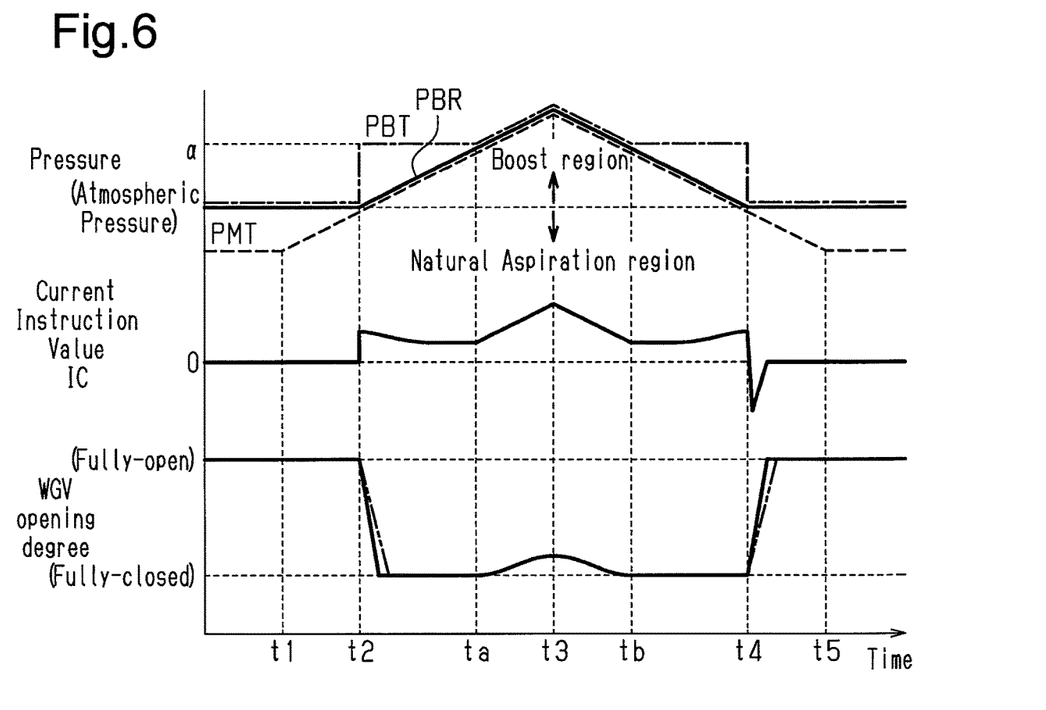
FIG. 6 is a time chart showing how the boost pressure control is performed in the engine shown in FIG. 1.

FIG. 6 shows how boost pressure control of the controller 37 of the present embodiment is performed when the target intake manifold pressure PMT changes in the same manner as the case of FIG. 5. In the present embodiment, among execution periods of the boost pressure control from time t2 to time t4, during a period from time t2 to time ta and a period from time tb to time t4, which are when the required boost pressure PBR is less than or equal to the preset pressure α, the preset pressure α instead of the required boost pressure PBR is assigned to the value of the target boost pressure PBT. In the present embodiment, even if a low boost pressure is assigned to the required boost pressure PBR, the wastegates 30A and 30B are driven with a large drive force, i.e., a large current instruction value IC. Thus, the drive control of the wastegates 30A and 30B in the boost pressure control limits the variation in the response resulting from the variation in the friction. As a result, deviation occurs in a limited manner in the WGC opening degrees between the banks, which causes the combustion to deteriorate.

In the present embodiment, the preset pressure α is used as the value of the target boost pressure PBT when the required boost pressure PBR is less than or equal to the preset pressure α. Accordingly, when the required boost pressure PBR changes across the preset pressure α, the value of the target boost pressure PBT changes continuously. This keeps the continuity of the feedback control.

The present embodiment may be modified as follows. The present embodiment and the following modifications can be combined as long as the combined modifications remain technically consistent with each other.

When the required boost pressure PBR is less than or equal to the preset pressure α, a boost pressure other than the preset pressure α may be assigned to the target boost pressure PBT. Further, when the required boost pressure PBR is less than or equal to the preset pressure α, the target boost pressure PBT does not have to be a fixed value and may be a value that changes depending on the required boost pressure PBR or the like. Even in such a case, as long as a higher boost pressure than the required boost pressure PBR is assigned to the target boost pressure PBT, the driving of the wastegates 30A and 30B with a small drive force in which the variation in the friction greatly affects the response is performed in a limited manner.

In the above embodiment, the drive control of the wastegates 30A and 30B in the boost pressure control is performed through the feedback control. Instead, the drive control may be performed through open control based on the target boost pressure PBT.

In the above embodiment, the two wastegates 30A and 30B, which are respectively arranged for the first bank 11A and the second bank 11B, are controlled. The control of the wastegates in the embodiment may be applied to the control of a single wastegate or three or more wastegates in the same manner.

In the above embodiment, an electric actuator that generates a drive force in accordance with energization to the direct-current motor 35 is used as the actuator 34 for the wastegates 30A and 30B. Alternatively, as long as the actuator is capable of controlling a drive force that is to be generated, other types of actuators such as a vacuum diaphragm may be used.

The controller can be configured by a device that includes a CPU and a ROM and executes software processing, but is not limited to this configuration. For example, at least part of the processes executed by the software in the above-described embodiment may be executed by hardware circuits dedicated to executing these processes (such as ASIC). That is, the controller may be modified as long as it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

The invention claimed is:

1. A controller for a wastegate, the wastegate being provided in an exhaust bypass passage of an engine that allows exhaust gas to bypass a turbine wheel of an exhaust turbine forced-induction device, comprising:
processes executed by processing circuitry to:
set a preset boost pressure,
determine a current running state of the vehicle based on a sensor provided to the engine,
set a required boost pressure corresponding to a target torque of the engine in accordance with the current running state of the engine,
actuate the wastegate to obtain a drive force at a magnitude that achieves the required boost pressure when the required boost pressure is higher than the preset boost pressure, and
actuate the wastegate to obtain the drive force at a magnitude that achieves a higher boost pressure than the required boost pressure when the required boost pressure is less than or equal to the preset boost pressure.

2. The controller according to claim 1, wherein the processes executed by the processing circuitry are further to:
actuate the wastegate to obtain the drive force through feedback control in which the processing circuitry receives the drive force as an input and outputs the required boost pressure,
determine the required boost pressure as a target value of the feedback control when the required boost pressure is higher than the preset boost pressure, and
determine a higher pressure than the required boost pressure as the target value of the feedback control when the required boost pressure is less than or equal to the preset boost pressure.

3. The controller according to claim 2, wherein the processes executed by the processing circuitry are further to set the preset boost pressure as the target value of the feedback control when the required boost pressure is less than or equal to the preset boost pressure.

4. The controller according to claim 1, wherein
the engine has a multi-bank structure including a plurality of banks, and
the exhaust turbine forced-induction device is one of a plurality of exhaust turbine forced-induction devices, which are respectively provided in the banks of the engine.

5. A method for controlling a wastegate, the wastegate being provided in an exhaust bypass passage of an engine that avows exhaust gas to bypass a turbine wheel of an exhaust turbine forced-induction device, the method comprising:
via a controller,
setting a preset boost pressure,
determining a current running state of the vehicle based on a sensor provided to the engine,
setting a required boost pressure in accordance with the current running state of the engine,
actuating the wastegate to obtain a drive force at a magnitude that achieves the required boost pressure when the required boost pressure is higher than the preset boost pressure, and
actuating the wastegate to obtain the drive force at a magnitude that achieves a higher boost pressure than the required boost pressure when the required boost pressure is less than or equal to the preset boost pressure.

6. A non-transitory computer-readable storage medium that stores a program causing a processor of a controller to execute a control process for a wastegate, the wastegate being provided in an exhaust bypass passage of an engine that allows exhaust gas to bypass a turbine wheel of an exhaust turbine forced-induction device, the control process comprising:
setting a preset boost pressure,
determining a current running state of the vehicle based on a sensor provided to the engine,
setting a required boost pressure in accordance with the current running state of the engine,
actuating the wastegate to obtain a drive force at magnitude that achieves the required boost pressure when the required boost pressure is higher than the preset boost pressure, and
actuating the wastegate to obtain the drive force at a magnitude that achieves a higher boost pressure than the required boost pressure when the required boost pressure is less than or equal to the preset boost pressure.

* * * * *